(12) United States Patent
Cansot et al.

(10) Patent No.: US 8,780,355 B2
(45) Date of Patent: Jul. 15, 2014

(54) PROCESS AND INSTRUMENT FOR RECONSTRUCTION OF AN IRREGULARLY SAMPLED NARROW-BAND SIGNAL

(75) Inventors: Elodie Cansot, Toulouse (FR); Emmanuel Christophe, Toulouse (FR); Alain Rosak, Toulouse (FR)

(73) Assignee: Centre National Detudes Spatiales (FR)

( * ) Notice: Subject to any disclaimer, the term of this patent is extended or adjusted under 35 U.S.C. 154(b) by 481 days.

(21) Appl. No.: 13/123,938

(22) PCT Filed: Sep. 1, 2009

(86) PCT No.: PCT/EP2009/061287
§ 371 (c)(1),
(2), (4) Date: Apr. 13, 2011

(87) PCT Pub. No.: WO2010/043442
PCT Pub. Date: Apr. 22, 2010

(65) Prior Publication Data
US 2011/0199616 A1    Aug. 18, 2011

(30) Foreign Application Priority Data
Oct. 13, 2008    (FR) ..................... 08 56901

(51) Int. Cl.
*G01B 9/02* (2006.01)
*G01J 3/453* (2006.01)
*G01J 3/457* (2006.01)

(52) U.S. Cl.
CPC .............. *G01J 3/4535* (2013.01); *G01J 3/453* (2013.01); *G01J 3/4531* (2013.01); *G01J 3/457* (2013.01)

USPC ........... 356/451; 356/450; 356/452; 356/455; 356/521

(58) Field of Classification Search
CPC ....... G01J 3/453; G01J 3/4531; G01J 3/4535; G01J 3/457
USPC ................... 356/451, 452, 455, 521
See application file for complete search history.

(56) References Cited

U.S. PATENT DOCUMENTS

| | | | | |
|---|---|---|---|---|
| 4,732,482 | A * | 3/1988 | Rippel .......................... | 356/451 |
| 5,838,438 | A * | 11/1998 | Peale et al. .................... | 356/451 |
| 6,351,307 | B1 * | 2/2002 | Erskine ......................... | 356/451 |
| 2009/0066727 | A1 * | 3/2009 | Lu et al. ........................ | 345/643 |
| 2011/0267625 | A1 * | 11/2011 | Guelachvili et al. .......... | 356/454 |

OTHER PUBLICATIONS

International Search Report, PCT/EP2009/061287, dated Nov. 13, 2009.

(Continued)

*Primary Examiner* — Tarifur Chowdhury
*Assistant Examiner* — Sunghee Y Gray
(74) *Attorney, Agent, or Firm* — Lerner, David, Littenberg, Krumholz & Mentlik, LLP

(57) ABSTRACT

According to a first aspect the invention relates to a reconstruction process of a narrow-band signal acquired by an instrument producing irregular sampling, in which two series of samples are acquired at the same sampling period, the two series being offset relative to one another such that the sampling errors are identical or quasi identical over both series. According to a second aspect, the invention relates to an instrument configured to carry out the process according to the first aspect of the invention.

15 Claims, 2 Drawing Sheets

Figure 1:
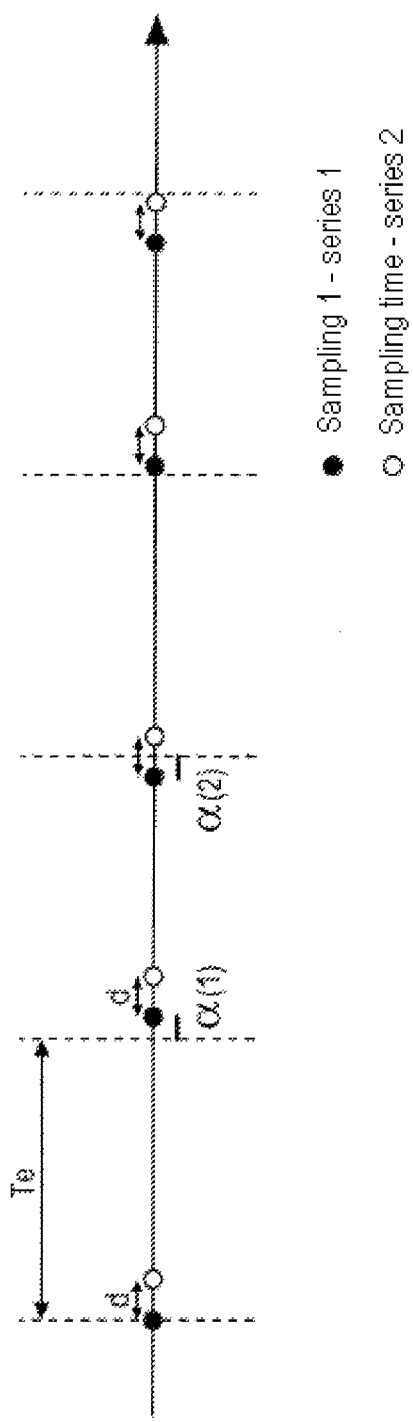

● Sampling 1 - series 1
○ Sampling time - series 2

(56) References Cited

OTHER PUBLICATIONS

Brachet F. et al: "Static Fourier' transform spectroscopy breadboards for atmospheric chemistry and climate" Proc.of SPIE, vol. 7100, Sep. 27, 2008, pp. 710019-1~710019-11,XP002526962.

Rosak A et al: "Progress report of a static Fourier transform spectrometer breadboard" 5th International Conference on Space Optics (ICSO 2004) ESA Noordwijk, Netherlands, 2004, pp. 67-71, XP002526972.

* cited by examiner

PROCESS AND INSTRUMENT FOR RECONSTRUCTION OF AN IRREGULARLY SAMPLED NARROW-BAND SIGNAL

CROSS REFERENCE TO RELATED APPLICATIONS

The present application is a national phase entry under 35 U.S.C. §371 of International Application No. PCT/EP2009/061287, filed Sep. 1, 2009, published in English, which claims the benefit of French Patent Application No. 0856901, filed Oct. 13, 2008. The disclosures of said applications are incorporated by reference herein.

The domain of the invention is that of narrow-band signals, and more precisely that of the reconstruction of narrow-band signals having been irregularly sampled.

The invention can be applied advantageously in spectrometry by static Fourier transform utilised especially for the purposes of remote sensing, in particular in the spatial sphere. The invention however aspires to be applied more widely to any technique in which irregular sampling of a narrow-band signal is undertaken, for example in the field of telecommunications, in particular when demodulation of the signal is not feasible.

It is recalled that a signal is narrow-band if its spectrum is limited and if it is zero around the frequency zero. In other terms, the spectrum of the signal is zero beyond two ranges of width Of centred around +/− $f_0$ (with $f_0$ not zero), and it is especially evident that the spectral width $\Delta f$ is low vis-à-vis the central frequency $f_0$.

A non-limiting example of application of the invention is that of interferometry to produce a spectrum in the infrared range. This can be monitoring atmospheric pollution, especially by way of obtaining concentration profiles for ozone and carbon monoxide. Two spectral bands are a particular focus: the band $B1=[1020\ cm^{-1}, 1080\ cm^{-1}]$ for ozone and the band $B2=[2132\ cm^{-1}, 2192\ cm^{-1}]$ for carbon monoxide.

In spectrometry by classic Fourier transform, the input signal (spectrum) is a limited-band signal and the signal acquired by the instrument, called interferogram (Fourier transform of the input signal), is sampled. The sampling period (Te) is imposed by Shannon theorem and must be less than the inverse of double the maximal frequency of the input signal. The sampling is conducted by moving a mirror by a distance equal to the sampling period. The sampling instant called path-length differences (PLD) are therefore:

PLD(k)=PLD(0)+kTe, where k represents the number of samples.

In spectrometry by static Fourier transform, the sampling is conducted using a multitude of mirrors in parallel (called gratings), each mirror being at a different position and the spread between two adjacent mirrors being equal to the sampling period.

For limited-band signals, this type of spectrometer is impossible to employ due to the fact of the excessive number of samples to be acquired and consequently of the number of gratings to be designed.

For narrow-band signals however, the number of samples to be acquired is considerably reduced and this type of spectrometer can be used. The narrow-band nature of the signal effectively allows selecting a sampling pitch greater than that imposed by classic Shannon theorem. The generalised Shannon theorem applicable to narrow-band signals imposes a sampling frequency less than the limit of the classic Shannon theorem. In fact, sampling produces periodising of the spectrum around the frequency Fe, and benefit can be drawn from the holes of the spectrum (as the signal is narrow-band) to fold back the spectrum in the holes. This leads to a set of possible intervals for the sampling period. In the limited case, the sampling period can almost attain the inverse of double the spectral width.

The disadvantage of static spectrometry is that the measured interferogram is sampled irregularly. In fact, by conception, the gratings cannot be arranged perfectly in their nominal position (due to the fact especially of polishing irregularities), resulting in irregular sampling.

From here, contrary to spectrometry by classic Fourier transform, it is not possible to retrieve the input signal by applying an inverse Fourier transform operation directly to the signal measured (interferogram). Spectrometry by static Fourier transform therefore requires knowing how to exploit an irregularly sampled interferogram.

It is noted here that this type of sampling is also called pseudo-regular sampling or quasi-regular to the extent where it concerns very slightly irregular sampling (irregularity originates from the production error of the gratings, of the order of a few microns), whereof the sampling instants are known and can be expressed in the form $t_n = nTe + \epsilon_n$, where Te represents the average sampling period and $\epsilon_n$ the sampling error.

The problem now is that of reconstruction of the spectrum of these irregularly sampled interferograms with the best precision possible.

Various methods have been proposed by the applicant to this end.

According to a first method, procedure goes directly from the irregular interferogram to the spectrum from the resolution of a matricial equation via the technique of least squares.

According to a second method, the measured signal is resampled on a regular pitch so as to reconstruct regular sampling by interpolation. This resampling technique is described especially in the publication by Kohlenberg, A. "Exact Interpolation of Band-Limited Functions", Journal of Applied Physics, vol. 24, number 12, p.p. 1432-1436, December 1953. Inverse Fourier transform is then performed to go back up to spectrum.

This second method is especially discussed in the article "Progress report of a static Fourier transform spectrometer breadboard", in: Proceedings of the 5th International Conference on Space Optics (ICSO 2004), 30 Mar.-2 Apr. 2004, Toulouse, France, by A. Rosak, and F. Tinto, 2004.

These methods are however not fully satisfactory.

In fact, if the signal measured is noisy (for example by white noise of detection type), the retrieved signal can be very different to the input signal. These reconstruction methods effectively amplify the noise of the signal measured, or even amplify the noise so much that the restored signal drowns in the noise.

The applicant also observed that in order to have the slightest distance between the input signal and the output signal the number of samples must be the greatest possible (that is, the smallest possible sampling period). So, over-sampling is performed in an attempt to minimise noise amplification. By way of example, if the aim is to limit noise amplification to 25%, the sampling period must be twice as small as that imposed by the Shannon generalised theorem, resulting in doubling the number of samples.

There is therefore a need for a reconstruction technique of a narrow-band signal sampled irregularly which reduces amplification of the noise during resampling of the measured signal, and preferably a technique using only a limited number of samples for resampling.

The aim of the invention is to respond to this need, and according to a first aspect a reconstruction process of a narrow-band signal acquired by an instrument undertaking irregular sampling is proposed, in which two series of samples are acquired at same sampling period, the two series being offset relative to one another such that the sampling errors are identical or quasi identical over both series.

Some preferred, though non-limiting, aspects of this process are the following:

the offset between the series is substantially equal to the quarter of the inverse the average frequency of the narrow-band signal;

the sampling period is less than or equal to the inverse of the spectral width of the narrow-band signal;

the process further comprises a resolution step of a matricial equation by the technique of least squares for moving directly from the samples of the two series to the spectrum of the narrow-band signal;

the process further comprises a step for determining regular theoretical samples from the samples of the two series;

the sampling period Te of the regular theoretical samples is restricted according to:

$k/(2*F_{min})<Te<(k+1)/(2*F_{max})$ with k a whole number, and $F_{min}$ and $F_{max}$ respectively the minimal frequency and the maximal frequency of the narrow-band signal;

the process further comprises an inverse Fourier transform operation for reconstructing the narrow-band signal from the regular theoretical samples;

the two series of sample are acquired by an interferometer;

the interferometer is a static grating interferometer;

the offset between the two series of samples is made temporally, the process successively comprising the operations of acquisition of the first series, displacement of a mobile element of the interferometer adaptively to achieve the offset and acquisition of the second series; and the two series of samples are acquired simultaneously.

Figure 2:
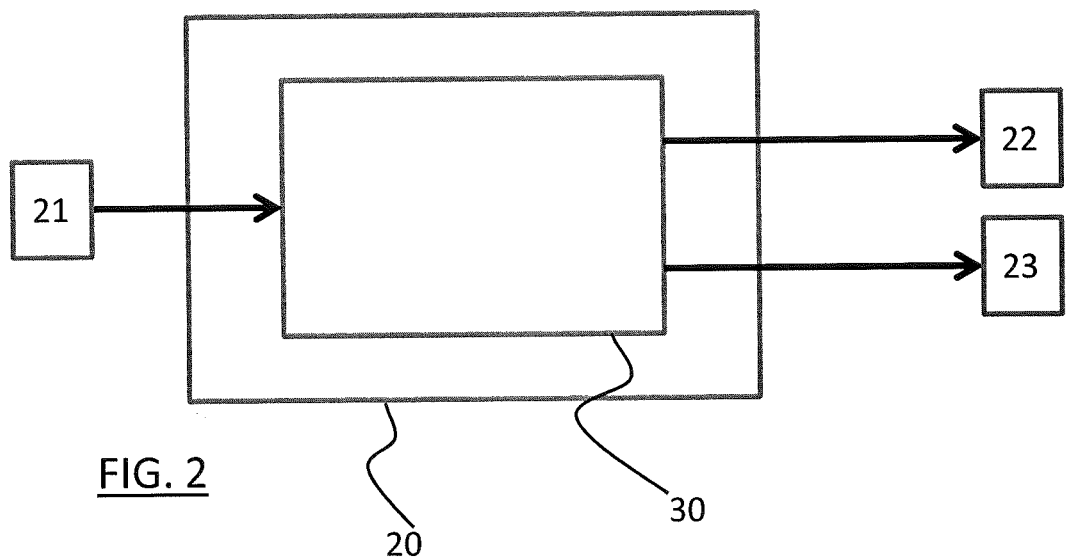
Figure 3:
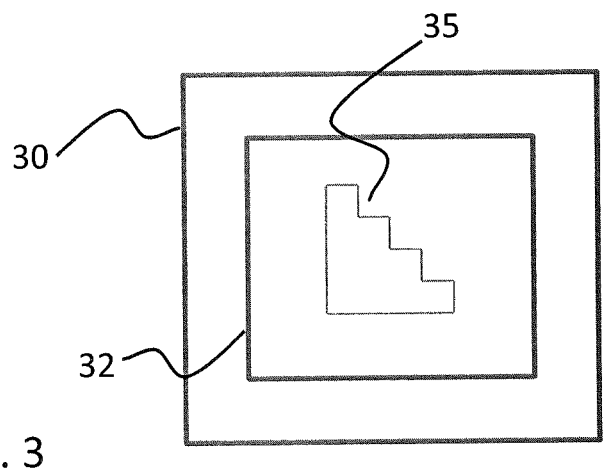

According to a second aspect, as depicted in FIGS. 2 and 3, the invention relates to an instrument 20 producing irregular sampling of a narrow-band signal 21, characterised in that it comprises means 30 for acquiring two series of irregular samples of the signal at the same sampling period, the two series being offset relative to one another such that the sampling errors are identical or quasi-identical over both series.

Some preferred, though non-limiting, aspects of this process are the following:

said means 30 comprise a mobile element 32 which can be moved to cause said offset between two series of sample acquired respectively before and after displacement of said element;

it comprises grating mirrors 35 where each grating is divided into two zones, and said means are formed by overthickness in one of the zones of each grating; and it comprises grating mirrors 35, and said means are formed by the inclination of one of the mirrors 35.

Other aspects, aims and advantages of the present invention will emerge more clearly from the following detailed description of preferred embodiments thereof, given by way of non-limiting example, and given in reference to the attached diagrams, whereof FIG. 1 is a sketch representing the irregular sampling used within the scope of the invention.

The example of spectrometry by static Fourier transform by a grating interferometer will be used hereinbelow. The invention is however not limited to this embodiment but aspires to apply more widely to any technique in which irregular sampling of a narrow-band signal is undertaken, especially by an instrument carrying out irregular sampling of the Fourier transform of the narrow-band signal, for example in telecommunications.

As discussed previously, the narrow-band nature of the signal allows to use the generalised Shannon theorem which says that the sampling pitch is less than or equal to the inverse of the spectral width of the narrow-band signal.

In the case of a narrow-band signal in the band B1 (for our example), at a minimum 961 samples according to a sampling pitch of 83.33 μm are therefore required.

Within the scope of the example presented here, a sampling pitch of 80 μm in the irregular interferogram and acquisition of around 1000 samples (corresponding to a cube comprising 32*32 gratings) are considered initially. The production error of the gratings typically has an amplitude of +/−5 μm, this value being imposed by technological restraints.

As seen previously, the methods of the prior art strongly amplify noise. To limit this amplification, more points can be acquired. For example, the acquisition of 1.5 times more points (respectively twice more) limits noise amplification to +40% (respectively +25%). The sampling pitch is accordingly 1.5 times (respectively twice) finer than that imposed by the generalised Shannon theorem. That is a sampling pitch of 55 μm (resp. 42 μm) and the acquisition of 1500 points (resp. 2000 points), which corresponds overall to a cube comprising 40*40 gratings (resp. 45*45 gratings). It is evident that in addition to an unsatisfactory noise level, these methods require an increased number of samples, and therefore production of a cube having an increased number of gratings.

The sampling errors due to conception of the gratings are defined according to the following model, given that acquisitions are made at pitch-length differences (PLD), such as:

$PLD(k)=PLD(0)+kTe+\alpha(k)$, where k represents the number of samples, Te represents the sampling pitch and α represents the irregularity of sampling.

Within the scope of the invention two series of samples are acquired at the same sampling period, the two series being offset relative to one another such that the sampling errors are identical or quasi-identical over both series.

The two series are thus made respectively at pitch differences PLD1 and PLD2 such as:

$PLD1(k)=PLD1(0)+kTe+\alpha(k)$; and $PLD2(k)=PLD2(0)+\beta(k)+kTe+\alpha(k)$

The samples of each of the series are thus offset by a distance $d(k)=PLD2(k)-PLD1(k)=PLD2(0)-PLD1(0)+\beta(k)$.

The system is preferably designed such that $\beta(k)=0$.

It is however possible to have a non-zero $\beta(k)$ on the condition that is known and limited, especially enabling tolerance of +/−λ/32 around $d(k)=\lambda/4$, to be shown hereinbelow. Within the scope of the invention, sampling errors quasi-identical over both series are therefore understood to mean errors diverging from one another only by a known and bound quantity.

A sample of the second series therefore corresponds to each sample of the first series, offset by the distance d.

FIG. 1 illustrates irregular sampling employed within the scope of the invention by means of the two series of offset sample.

It was seen previously that the generalised Shannon theorem imposes acquisition of 1000 samples with a sampling pitch de 80 μm.

A first interferogram with a sampling pitch of 80 μm and 1000 points, and a second interferogram with a sampling pitch of 80 μm and 1000 points and offset relative to the first by the distance d are therefore acquired.

The applicant evaluated amplification of the noise for the double offset sampling according to the invention and compared this amplification to that observed in the case where only one interferogram is acquired.

The reconstruction algorithm is that based on the interpolation method discussed previously, allowing obtaining the regular interferogram from the irregular interferogram by means of a passage matrix which is inverted.

It is evident that this matrix inverts well if it is well conditioned (it is then close to a unitary matrix). In the opposite case, inversion of the matrix amplifies noise and can make the interferogram unusable.

To characterise noise amplification, a first method consists of addressing the Eigen values of the matrix and the moments of order 2. A second method consists of adding white radiometric noise to the irregular interferogram and calculating the noise amplification by comparing the noise value in the irregular interferogram and in the regular interferogram (reconstructed).

The applicant noticed that the noise is almost not amplified within the scope of the invention, irrespective of the sampling period.

The applicant also noticed that the value d of the offset between the two series of samples influences the performance of the reconstruction. A distance of $\lambda/4$ (where $\lambda=1/f_0$ represents the wavelength of the narrow band; 2381 nm in the case of the band B1) appears as the optimum to make noise amplification quasi-zero. Performance degradation also proves progressive such that a tolerance can be made on realisation of the offset, and especially a tolerance of the order of $+/-\lambda/32$ around $\lambda/4$ (or a tolerance of $+/-300$ nm in the case of the band B1).

Particularly advantageously, the invention enables an increase in the sampling pitch beyond the sampling pitch imposed by the generalised Shannon theorem (pitch of 80 μm in the example considered). Doubling up the points made within the scope of the invention due to the fact of acquiring two series of offset samples effectively releases the sampling pitch by a factor of two. In this case, the condition on the sampling pitch of each series is therefore less than the inverse of the frequential width of the input signal. It is noted that the generalised Shannon theorem is always respected, but that the information is distributed differently.

Within the scope of this advantageous variant, and returning to the example of the band B1, two interferograms (e.g., interferograms 22 and 23 depicted in FIG. 2) sampled with a pitch of 160 μm can be acquired, and for which the samples are all offset in pairs by a distance d, preferably by a distance $d=\lambda/4$, each of the series comprising 500 samples.

The applicant noticed that the results are as good as in the case where the sample is taken at the generalised Shannon pitch (80 μm in the example), with the advantage here of reducing the number of samples necessary in each of the series.

According to a first execution of the invention, the two series of offset samples are acquired simultaneously. 500 samples with a pitch of 160 μm (first series) and 500 samples offset by d vis-à-vis the samples of the first also with a pitch of 160 μm (second series) can be acquired in this way. 1000 samples are necessary in toto, corresponding to a cube comprising 24*24 gratings (each grating being doubled for acquisition of two samples).

To carry out such simultaneous acquisition of two offset series, it is proposed to carry out thin-layer processing on each grating of the interferometer. Each grating is thus divided into two zones and an overthickness is deposited on one at least of the zones, for example by evaporation of a material under vacuum, in such a way that the difference in thickness between the two zones of the same grating creates the offset d. In this embodiment a non-constant, though known and limited, $\beta(k)$ is observed.

According to a variant embodiment, a slight inclination is introduced between the two mirrors so as to introduce the offset d between one edge of the grating and the other edge of the grating. This offset is continuous and supposes acquisition of more than two samples so as not to lose interferometric contrast.

According to a second execution of the invention, the two series of sample offset are acquired successively. To do this, the first series is acquired, then a mobile element of the interferometer is shifted adaptively to cause the offset and the second series is then acquired. In this case, the interferometer has a mobile element and can be configured to enable acquisition of 500 samples, corresponding to a cube comprising 24*24 gratings.

To create the offset between the two successively acquired series, it is proposed to shift a mobile element of the interferometer.

According to a first variant, the difference in pitch on one of the two arms of the interferometer is slightly varied so as to cause the offset d, for example by positioning one of the grating mirrors of the interferometer on a piezoelectric mechanism.

According to a second variant, a slight inclination movement (tilting movement) or a slight translation movement of a glass blade or plate (prism in the case of translation) is used, optionally offset in an arm of the interferometer to cause offset. This glass plate can be the compensating plate of the interferometer. This produces mechanically very pure movement, with a piezoelectric-based displacement device.

The following table lists the different numerical examples specified in the present description in conjunction with the example of a narrow-band signal in the band B1.

| | Single sampling according to the prior art | No sampling according to generalised Shannon | Double sampling according to the invention | | |
|---|---|---|---|---|---|
| | | | | Release of the sampling pitch | |
| | | | Simultaneous acquisition of the two series | Displacement of a mobile element causing offset between the acquisition of the two series | |
| Noise level | +40% | +25% | <3% | <3% | <3% |
| number of necessary samples | 1500 | 2000 | 2000 (1000 per series) | 1000 (500 per series) | 1000 (500 per series) |
| Pitch | 55 μm | 42 μm | 80 μm | 160 μm | 160 μm |
| Number of necessary gratings | 40 * 40 | 45 * 45 | 32 * 32 | 24 * 24 (each grating separated into two or more zones) | 24 * 24 |

It will have been understood that in the case of double sampling according to the invention, amplification of noise is quasi-zero, irrespective of the sampling period. Therefore contrary to single sampling specified in the prior art, there is no need to increase the number of samples to limit the noise level.

Also, to the extent where two series of sample are used, the sampling period of each series can be made greater than the sampling period imposed by the generalised Shannon theorem (the condition on the sampling period of each series being less than the inverse of the frequential width of the input signal).

Accordingly, the double sampling according to the invention at the same time allows, especially when the offset is taken substantially at the optimum $\lambda/4$, not to amplify noise during resampling of the measured signal, to make the reconstruction algorithm more stable and to reduce the number of samples necessary for resampling.

It is specified here that once the samples of the two series are acquired, reconstruction methods mentioned in the introduction are similarly proceeded to go back up to the spectrum of the narrow-band signal (direct passage of the irregular samples to the spectrum by resolution of a matricial equation by the technique of least squares; resampling on a regular pitch so as to reconstruct regular sampling by interpolation, then inverse Fourier transform for go back up to spectrum). In the case of the resampling on a regular pitch, the sampling period of the regular theoretical samples is restricted according to: $k/(2*F_{min}) < Te < (k+1)/(2*F_{max})$ with k a whole number, and $F_{min}$ and $F_{max}$ respectively the minimal frequency and the maximal frequency of the narrow-band signal.

The invention claimed is:

1. A process for reconstruction of a narrow-band signal acquired by an instrument undertaking an irregular sampling, the process comprising:
   acquiring at a sampling period a first interferogram from a first series of samples of the narrow-band signal by creation of a finite number of path-length differences, and
   acquiring a second interferogram at said sampling period, from a second series of samples of the narrow-band signal by offsetting each path-length difference of the first interferogram, such that the sampling errors are identical over both series of samples or diverging from one another only by a known and bound quantity over both series of samples.

2. The process as claimed in claim 1, in which the offset between the series is substantially equal to the quarter of the inverse of the average frequency of the narrow-band signal.

3. The process as claimed in claim 1, in which the sampling period is less than or equal to the inverse of the spectral width of the narrow-band signal.

4. The process as claimed in claim 1, further comprising a resolution step of an equation to calculate least squares given in a matric form to proceed directly from the samples of the two series to the spectrum of the narrow-band signal.

5. The process as claimed in claim 1, further comprising a step for determining regular theoretical samples from the samples of the two series.

6. The process as claimed in claim 5, in which the sampling period Te of the regular theoretical samples is restricted according to:

$k/(2*F_{min}) < Te < (k+1)/(2*F_{max})$ with k a whole number, and $F_{min}$ and $F_{max}$ respectively the minimal frequency and the maximal frequency of the narrow-band signal.

7. The process as claimed in claims 5, further comprising an inverse Fourier transform operation to reconstruct the narrow-band signal from the regular theoretical samples.

8. The process as claimed in claim 1, in which the two series of sample are acquired by an interferometer.

9. The process as claimed in claim 8, in which the interferometer is a static interferometer comprising at least one grating mirror and a compensating plate.

10. The process as claimed in claim 9 in which the offset between the two series of samples is made temporally, the process successively comprising the operations of acquisition of the first series, translating or tilting of a mobile grating mirror of the interferometer adaptively to carry out the offset and acquisition of the second series.

11. The process as claimed in claim 9 in which the two series of samples are acquired simultaneously.

12. An instrument undertaking an irregular sampling of a narrow-band signal, characterised in that it comprises means for acquiring a first interferogram and a second interferogram at the same sampling period, the first interferogram corresponding to the acquisition of a first series of samples of the narrow-band signal by creation of a finite number of path-length differences, and the second interferogram corresponding to the acquisition of a second series of samples of the narrow-band signal by offsetting each path-length difference of the first interferogram such that the sampling errors are identical or quasi-identical over both series, wherein the means for acquiring said interferograms comprise at least one mobile grating mirror capable of being translated or tilted to cause said offset between two series of samples acquired respectively before and after displacement of the at least one grating mirror.

13. The instrument as claimed in claim 12 comprising grating mirrors, in which said means are formed by the inclination of one of the mirrors.

14. An instrument undertaking an irregular sampling of a narrow-banded signal, characterized in that it comprises a mobile glass blade and grating mirrors, wherein said mobile glass blade is capable of being translated or tilted to cause an offset between two series of samples acquired respectively before and after displacement of one of the grating mirrors in order to acquire a first interferogram and a second interferogram at the same sampling period, the first interferogram corresponding to the acquisition of a first series of samples of the narrow-band signal by creation of a finite number of path-length differences, and the second interferogram corresponding to the acquisition of a second series of the samples of the narrow-band signal by offsetting each path-length difference of the first interferogram such that the sampling errors are identical or quasi-identical over both series.

15. The instrument as claimed in claim 14, wherein the glass blade is a compensating plate of the first interferometer and the second interferometer.

* * * * *